US012556863B2

(12) United States Patent
Kaetel

(10) Patent No.: US 12,556,863 B2
(45) Date of Patent: Feb. 17, 2026

(54) LOUDSPEAKER, SIGNAL PROCESSOR, METHOD FOR MANUFACTURING THE LOUDSPEAKER, OR METHOD FOR OPERATING THE SIGNAL PROCESSOR BY USING DUAL-MODE SIGNAL GENERATION WITH TWO SOUND GENERATORS

(71) Applicant: Kaetel Systems GmbH, Munich (DE)

(72) Inventor: Klaus Kaetel, Munich (DE)

(73) Assignee: KAETEL SYSTEMS GMBH, Munich (DE)

( * ) Notice: Subject to any disclaimer, the term of this patent is extended or adjusted under 35 U.S.C. 154(b) by 201 days.

(21) Appl. No.: 18/480,657

(22) Filed: Oct. 4, 2023

(65) Prior Publication Data

US 2024/0031738 A1 Jan. 25, 2024

Related U.S. Application Data

(63) Continuation of application No. PCT/EP2022/059311, filed on Apr. 7, 2022.

(30) Foreign Application Priority Data

Apr. 13, 2021 (DE) ......................... 102021203632.5

(51) Int. Cl.
*H04R 3/12* (2006.01)
*H04R 1/02* (2006.01)
(Continued)

(52) U.S. Cl.
CPC ............... *H04R 3/12* (2013.01); *H04R 1/025* (2013.01); *H04R 1/2842* (2013.01); *H04R 1/403* (2013.01);
(Continued)

(58) Field of Classification Search
CPC ........ H04R 3/12; H04R 1/025; H04R 1/2842; H04R 1/403; H04R 5/02; H04R 1/2803;
(Continued)

(56) References Cited

U.S. PATENT DOCUMENTS 4,215,761 A 8/1980 Andrews
4,391,346 A * 7/1983 Murakami .............. H04R 1/24 181/147

(Continued)

FOREIGN PATENT DOCUMENTS

CN 1663321 A 8/2005
EP 0808076 A1 11/1997

(Continued)

OTHER PUBLICATIONS

International Search Report and Written Opinion dated Oct. 20, 2022, issued in application No. PCT/EP2022/059311.

*Primary Examiner* — Mark Fischer
(74) *Attorney, Agent, or Firm* — McClure, Qualey & Rodack, LLP

(57) ABSTRACT

A loudspeaker includes a first sound generator with a first emission direction, and a second sound generator with a second emission direction, wherein the first sound generator and the second sound generator are arranged with respect to each other such that the first emission direction and the second emission direction intersect in a sound chamber and comprise an intersection angle that is larger than 60° and smaller than 120°; and a housing that accommodates the first sound generator and the second sound generator and the sound chamber, wherein the housing comprises a gap configured to enable gas communication between the sound chamber and the surrounding area of the loudspeaker.

33 Claims, 9 Drawing Sheets

(51) Int. Cl.

| | |
|---|---|
| ***H04R 1/28*** | (2006.01) |
| ***H04R 1/40*** | (2006.01) |
| ***H04R 5/02*** | (2006.01) |
| ***H04S 3/00*** | (2006.01) |
| ***H04S 7/00*** | (2006.01) |

(52) U.S. Cl.
CPC ............... *H04R 5/02* (2013.01); *H04S 3/008* (2013.01); *H04S 7/307* (2013.01); *H04S 2400/01* (2013.01)

(58) Field of Classification Search
CPC ......... H04R 1/227; H04S 3/008; H04S 7/307; H04S 2400/01
See application file for complete search history.

(56) References Cited

U.S. PATENT DOCUMENTS

| | | | |
|---|---|---|---|
| 5,136,651 | A | 8/1992 | Cooper et al. |
| 6,122,381 | A | 9/2000 | Winterer |
| 7,751,581 | B2 | 7/2010 | Heil |
| 10,231,054 | B2 | 3/2019 | Kaetel |
| 2002/0106097 | A1 | 8/2002 | Danley et al. |
| 2004/0005066 | A1 * | 1/2004 | Kraemer ................... H04S 5/00 381/17 |
| 2010/0303245 | A1 | 12/2010 | Vickers |
| 2020/0169808 | A1 * | 5/2020 | Willems ................... H04R 5/02 |

FOREIGN PATENT DOCUMENTS

| | | | |
|---|---|---|---|
| EP | 2637417 | A1 | 9/2013 |
| EP | 3061266 | A0 | 8/2016 |
| EP | 2692144 | B1 | 2/2017 |
| EP | 2692154 | B1 | 9/2017 |
| EP | 2692151 | B1 | 1/2018 |
| EP | 3061262 | B1 | 1/2018 |
| WO | 9009728 | A1 | 8/1990 |
| WO | 9109507 | A1 | 6/1991 |
| WO | 2017102278 | A1 | 6/2017 |

* cited by examiner without partition wall, combined with inter-leaved band passes (Fig. 3a)

| no. | original base push-pull signal /81 |
|---|---|
| 1 | separate recording and/or processing (Fig. 2a) |
| 2 | calculation from side-signal (Fig. 4b) |
| 3 | derivation from common-mode signal (Fig. 4c) |
| ⋮ | ⋮ |

BP filter with $f_1$, $f_3$, $f_5$, … belongs to 1st plurality

BP filter with $f_2$, $f_4$, $f_6$, … belongs to 2nd plurality

LOUDSPEAKER, SIGNAL PROCESSOR, METHOD FOR MANUFACTURING THE LOUDSPEAKER, OR METHOD FOR OPERATING THE SIGNAL PROCESSOR BY USING DUAL-MODE SIGNAL GENERATION WITH TWO SOUND GENERATORS

CROSS-REFERENCE TO RELATED APPLICATIONS

This application is a continuation of copending International Application No. PCT/EP2022/059311, filed Apr. 7, 2022, which is incorporated herein by reference in its entirety, and additionally claims priority from German Application No. 102021203632.5, filed Apr. 13, 2021, which is also incorporated herein by reference in its entirety.

The present invention relates to audio signal processing and reproduction, and in particular to a loudspeaker with at least two sound generators for generating a dual mode signal comprising common mode components and push-pull components

BACKGROUND OF THE INVENTION

Typically, acoustic scenes are recorded using a set of microphones. Each microphone outputs a microphone signal. For example, 25 microphones may be used for an audio scene of an orchestra. A sound engineer then mixes the 25 microphone output signals, e.g., into a standard format such as a stereo format, a 5.1 format, a 7.1 format, a 7.2 format, or any other corresponding format. In case of a stereo format, e.g., the sound engineer or an automatic mixing process generates two stereo channels. In the case of a 5.1 format, mixing results in five channels and one subwoofer channel. Analogously, in case of a 7.2 format, e.g., mixing results in seven channels and two subwoofer channels. If the audio scene is to be rendered in a reproduction environment, a mixing result is applied to electrodynamic loudspeakers. In a stereo reproduction scenario, there are two loudspeakers, the first loudspeaker receiving the first stereo channel and the second loudspeaker receiving the second stereo channel. For example, in a 7.2 reproduction format, there are seven loudspeakers at predetermined positions, and two subwoofers, which can be placed relatively arbitrarily. The seven channels are applied to the corresponding loudspeakers, and the subwoofer channels are applied to the corresponding subwoofers.

The use of a single microphone arrangement when capturing audio signals, and the use of a single loudspeaker arrangement when reproducing the audio signals typically neglects the true nature of the sound sources. European patent EP 2692154 B1 describes a set for capturing and reproducing an audio scene, in which not only the translation but also the rotation and, in addition, the vibration is captured and reproduced. Thus, a sound scene is not only reproduced by a single capturing signal or a single mixed signal but by two capturing signals or two mixed signals that, on the one hand, are recorded simultaneously, and that, on the other hand, are reproduced simultaneously. This ensures that different emission characteristics of the audio scene are recorded compared to a standard recording, and are reproduced in a reproduction environment.

To this end, as is illustrated in the European patent, a set of microphones is placed between the acoustic scene and a (imaginary) listener space to capture the “conventional” or translation signal that is characterized by a high directionality, or high quality.

In addition, a second set of microphones is placed above or to the side of the acoustic scene to record a signal with lower quality, or lower directionality, that is intended to represent the rotation of the sound sources in contrast to the translation.

On the reproduction side, corresponding loudspeakers are placed at the typical standard positions, each of which has a omnidirectional arrangement to reproduce the rotation signal, and a directional arrangement to reproduce the “conventional” translational sound signal. In addition, there is a subwoofer at each of the standard positions, or there is only a single subwoofer at an arbitrary location.

European patent EP 2692144 B1 discloses a loudspeaker for reproducing, on the one hand, the translational audio signal and, on the other hand, the rotatory audio signal. The loudspeaker has, on the one hand, an arrangement that emits in an omnidirectional manner, and, on the other hand, an arrangement that emits in a directional manner.

European patent EP 2692151 B1 discloses an electret microphone that can be used for recording the omnidirectional or the directional signal.

European patent EP 3061262 B1 discloses earphones and a method for manufacturing earphones that generate both a translational sound field and a rotatory sound field.

European patent application EP 3061266 A0, which is intended for grant, discloses earphones and a method for producing earphones configured to generate the “conventional” translational sound signal by using a first transducer, and to generate the rotatory sound field by using a second transducer arranged perpendicular to the first transducer.

Recording and reproducing the rotatory sound field in addition to the translational sound field leads to a significantly improved and therefore high-quality audio signal perception that almost conveys the impression of a live concert, even though the audio signal is reproduced by the loudspeaker or headphones or earphones.

This achieves a sound experience that can almost not be distinguished from the original sound scene in which the sound is not emitted by loudspeakers but by musical instruments or human voices. This is achieved by considering that the sound is emitted not only translationally but also in a rotary manner and possibly also in a vibrational manner, and is therefore to be recorded and reproduced accordingly.

A disadvantage of the concept described is that recording the additional signal that reproduces the rotation of the sound field represents a further effort. In addition, there are many pieces of music, for example classical pieces or pop pieces, where only the conventional translational sound field has been recorded. Typically, the data rate of these pieces is heavily compressed, e.g., according to the MP3 standard or the MP4 standard, contributing to an additional deterioration of quality, however, which is typically only audible for experienced listeners. On the other hand, there are almost no audio pieces that have not been recorded at least in the stereo format, with a left channel and a right channel. Rather, the development goes towards generating more channels than only a left and a right channel, i.e. generating surround recordings with five channels or even recordings with higher formats, for example, which is known under the keyword MPEG surround or Dolby Digital in the technology.

Thus, there are many pieces that have been recorded at least in the stereo format with a first channel for the left side and a second channel for the right side. There are even more and more pieces where recording has been done with more than two channels, e.g., for a format with several channels on the left side and several channels on the right side and one channel in the center. Even higher level formats use more than five channels in the horizontal plane and in addition also channels from above or channels from obliquely above and possibly also, if possible, channels from below.

In particular, the provision of loudspeakers for reproducing the translational component, or common-mode component, and the rotatory component, or the push-pull component, has been elaborate and not very compact. This is not critical if there is enough space for large loudspeakers. However, if more compact loudspeakers are to be used, the existing concept with separate sound generators for the translational component on the one hand and for the rotatory component on the other hand is not optimal.

SUMMARY

According to an embodiment, a loudspeaker may have: a first sound generator with a first emission direction, and a second sound generator with a second emission direction, wherein the first sound generator and the second sound generator are arranged with respect to each other such that the first emission direction and the second emission direction intersect in a sound chamber and include an intersection angle that is larger than 60° and smaller than 120°; and a housing that accommodates the first sound generator and the second sound generator and the sound chamber, wherein the housing includes a gap configured to enable gas communication between the sound chamber and the surrounding area of the loudspeaker.

According to another embodiment, a signal processor for generating a control signal for a loudspeaker with a first sound generator and with a second sound generator, wherein the control signal includes a first sound generator signal for the first sound generator and a second sound generator signal for the second sound generator, may have: an input for receiving a channel signal for the loudspeaker; a signal combiner configured to overlap a common-mode signal with a first push-pull signal so as to obtain the first sound generator signal, and to overlap the common-mode signal with a second push-pull signal so as to obtain the sound generator signal, wherein the second push-pull signal differs from the first push-pull signal; and wherein the signal processor is configured to derive the common-mode signal or the first and the second push-pull signal from the channel signal for the loudspeaker, and an output interface for outputting the first sound generator signal and the second sound generator signal.

According to another embodiment, a method for manufacturing a loudspeaker with a first sound generator with a first emission direction, and a second sound generator with a second sound emission direction, may have the steps of: arranging the first sound generator and the second sound generator with respect to each other such that the first emission direction and the second emission direction intersect in a sound chamber and include an intersection angle that is larger than 60° and smaller than 120°; and accommodating the loudspeaker with a housing that accommodates the first sound generator and the second sound generator and the sound chamber, wherein the housing includes a gap configured to enable a gas communication between the sound chamber and the surrounding area of the loudspeaker.

According to another embodiment, a method for operating a signal processor for generating a control signal for a loudspeaker with a first sound generator and with a second sound generator, wherein the control signal includes a first sound generator signal for the first sound generator and a second sound generator signal for the second sound generator, may have the steps of: receiving a channel signal for the loudspeaker; combining signals to overlap a common-mode signal with a first push-pull signal so as to obtain the first sound generator signal, and to overlap the common-mode signal with a second push-pull signal so as to obtain the sound generator signal, wherein the second push-pull signal differs from the first push-pull signal; and wherein the common-mode signal or the first and the second push-pull signal are derived from the channel signal for the loudspeaker, and outputting the first sound generator signal and the second sound generator signal.

Another embodiment may have a non-transitory digital storage medium having a computer program stored thereon to perform the inventive method for operating a signal processor for generating a control signal for a loudspeaker with a first sound generator and with a second sound generator, when said computer program is run by a computer The present invention is based on the finding that, with respect to the loudspeaker, a first sound generator with a first emission direction and a second sound generator with a second emission direction are used, wherein the sound generators are arranged with respect to each other such that a first emission direction of the first sound generator and a second emission direction of the second sound generator intersect in a sound chamber and have an intersection angle that is greater than 60° and smaller than 120°. In addition, the first sound generator and the second sound generator and the sound chamber are accommodated in a housing, wherein the housing includes a gap that is configured to enable gas communication between the sound chamber and a surrounding area of the loudspeaker.

With respect to the signal processor, the first sound generator and the second sound generator are driven such that a common-mode signal supplied to the first sound generator and the second sound generator is overlapped with a push-pull signal so as to obtain the control signal for the first sound generator. Furthermore, the common-mode signal is overlapped with a second push-pull signal so as to obtain the control signal for the second sound generator. The two push-pull signals differ from each other.

This achieves that both sound generators together reproduce the common-mode signal, i.e. the translational component, and the push-pull signal, i.e. the rotatory component. Due to the fact that the sound emission of the two sound generators is mixed in the sound chamber, and due to the fact that a gap is provided in the housing, through which the sound can exit from the sound chamber into the surrounding area of the loudspeaker, it is achieved that the exiting sound has translational and rotatory components, i.e. common mode parts and push-pull parts. In particular, it has been shown that, when leaving the gap, the sound has sound particle velocity vectors that represent the translational component, directed away from the propagation direction of the sound transducer. These sound particle velocity vectors representing the translational component are directed towards the source or away from the source, and change their length, however, they do not rotate. It has been found at the same time, however, due to the arrangement of the sound generators in the sound chamber, the generated output sound signal also comprises sound particle velocity vectors that rotate, and therefore generate a rotatory sound signal in the surrounding area of the loudspeaker, which, together with the translational sound field, leads to the audio perception becoming particularly natural.

In contrast to conventional transducers that only generate a translational sound field, the quality of the inventive loudspeaker is superior because, in addition to the translational sound field, the rotatory sound field is generated as well, creating a particularly high-quality almost "live" impression. On the other hand, the generation of these particularly natural sound fields with translational and rotational components, i.e. with linear and rotating sound particle velocity vectors, is particularly compact because two sound generators arranged obliquely to each other in one sound chamber generate the combined sound field that exits through a gap.

According to an aspect of the present invention, the loudspeaker is arranged to be separate from the signal processor. In such an embodiment, the loudspeaker has two signal inputs that may be wired or wireless, wherein a signal for one sound generator in the loudspeaker is generated at each signal input. The signal processor providing the control signals for the sound generators is arranged remotely from the actual loudspeaker and is connected to the loudspeaker via a communication link, such as a wired link or a wireless link.

In an another embodiment, the signal processor is integrated into the loudspeaker. In such a case, in the loudspeaker with the integrated signal processor, the common-mode signal is derived and, according to the implementation and the embodiment, the push-pull signal is derived separately, or from the common-mode signal. An aspect of the present invention therefore concerns the loudspeaker without a signal processor. Another aspect of the present invention therefore also concerns the signal processor without a loudspeaker, and a further aspect of the present invention concerns the loudspeaker with an integrated signal processor.

In embodiments, the two push-pull signals are derived from a base push-pull signal by using two all-pass filter processes, wherein, in an embodiment, the base push-pull signal is filtered with a first all-pass filter so as to generate the first push-pull signal directly or, possibly, by using further processing steps. The base push-pull signal is filtered with a second all-pass filter that differs from the first all-pass filter so as to generate the second push-pull signal for the second sound generator in the loudspeaker directly or, possibly, by using further processing steps.

According to the implementation, filterbank processing may be performed in the push-pull signal processing, wherein two interleaved, or interlocked, or "interlaced", filterbanks are provided in the two processing branches for the two push-pull signals. Through this, the push-pull signal of the two sound transducers is interleaved in terms of frequency, so to speak, or is brought into the sound chamber in a frequency-multiplexed way. It has been shown that, in such a case, to at least partially separate the sound output of the first sound generator from the sound output of the second sound generator, a partition wall in the sound chamber is not required. In contrast, if interleaved filterbank processing is not carried out, but the two push-pull signals essentially have identical frequency components across the entire frequency range, it is advantageous to provide a partition wall in the sound chamber, which leads to an increase of the ratio of the rotating sound particle velocity vectors in the output signal and, at the same time, to an overall more efficient sound output.

The base push-pull signal processed by using two different all-pass filters to generate the two push-pull signals for the two sound generators in the loudspeaker may be obtained in different ways. It is one possibility to record this signal directly in a separate way with certain microphone arrangements and to generate it as a combined audio representation together with the translational or common-mode signal. This ensures that the common-mode signal for the translational sound component and the push-pull signal for the rotational sound component are not mixed in the inventive signal processor on the way from the recording to the reproduction.

In an alternative embodiment, e.g., if the separate rotatory component signal is not present and there is only a mono signal or one channel signal, the base push-pull signal may be derived from the common-mode signal by high-pass filtering and/or, possibly, attenuation or amplification.

In a further embodiment of the present invention, when there is a multi-channel signal, e.g., a stereo signal or a signal with three or more channels, the push-pull signal is derived from this multi-channel representation. In the case of a stereo signal, e.g., a side signal representing the difference of the left and the right channel is calculated, wherein, if applicable, this side signal is then attenuated or amplified accordingly, and, according to the implementation, is mixed with a common-mode signal that is not high-pass filtered or is high-pass filtered. In principle, the side signal itself may already be used as the base push-pull signal if the output signal is a stereo signal. If the output signal has several channels, the base push-pull signal may be generated as the difference between any two channels of the multi-channel representation. Thus, for example, a difference between the left rear side and the right rear side (right surround) could be generated, or, alternatively, a difference between the center channel and one of the other four channels of a five-channel representation. In case of such a five-channel representation, a difference between left and right may be determined to generate the side signal, as is the case in a stereo representation. In a further embodiment, certain channels of the five-channel representation may be added, i.e. a two-channel downmix may be determined, from which the base push-pull signal may be obtained through calculating a difference. An exemplary implementation for generating a two-channel downmix signal consists of the addition, possibly with weighting factors, left rear (left surround|), left, and center, so as to generate a left downmix channel. To generate the right downmix channel, the right surround channel, the right channel and the center channel are again added up, possibly with weighting factors. The base push-pull signal may then be determined from the left downmix channel and the right downmix channel by calculating the difference.

Thus, there are different possibilities to derive a separate push-pull signal from conventional common-mode signals if such a push-pull signal does not (yet) exist.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
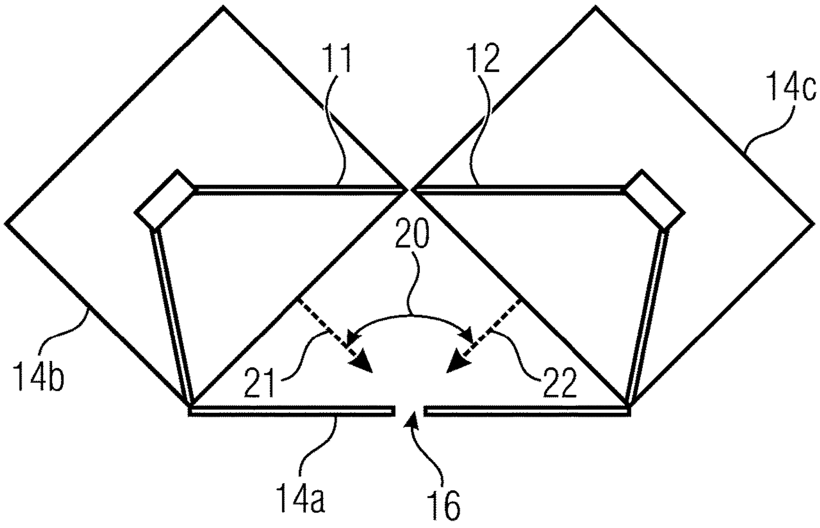
FIG. 1*a* shows a sectional view of a loudspeaker according to an aspect of the present invention.

FIG. 1*a* shows a loudspeaker having a first sound generator 11 with a first emission direction 21 and a second sound generator with a second emission direction 22. Both sound generators 11, 12 are arranged with respect to each other such that the two emission directions 21, 22 intersect in a sound chamber and have an intersection angle 20 that is larger than 60° and smaller than 120°. In the embodiment of FIG. 1*a*, the two sound generators are arranged such that the emission directions of the sound generators intersect at an angle of 90°, or in a range between 80° and 100°. However, even if the sound generators are arranged such that the angle α is larger than an angle of 60°, thus, if the emission directions become more parallel, or if the angle 20 in FIG. 1*a* increases to up to 120°, i.e. if the emission directions of the sound generators are less parallel or directed more towards each other, there is a good sound emission characteristic of the loudspeaker.

The sound chamber is formed by the area between the membrane of the first sound generator 11 and the membrane of the second sound generator 12, and a frontal wall of the housing, indicated with 14*a*. A gap 16 configured to enable gas communication between the sound chamber within the loudspeaker and a surrounding area of the loudspeaker is provided in the housing, or in the frontal wall of the housing. In particular, in the embodiment shown in FIG. 1*a*, the first sound generator 11 is accommodated separately with the housing 14*b*. In addition, the second sound generator 12 is in turn accommodated with a separate housing 14*c*. This ensures that the rear sides of the two sound generators 11, 12, i.e. the sides of the sound generators facing away from the sound chamber, do not communicate with each other, since a gas-tight seal is provided where the two sound generators touch opposite the gap. In addition, the sound generators themselves are sealed tight with respect to their rear side, apart from air openings needed for normal loudspeakers, however, which are not critical for the sound generation, but just ensure pressure equalization so that the corresponding membrane of the sound generator can move freely.

Figure 1B:
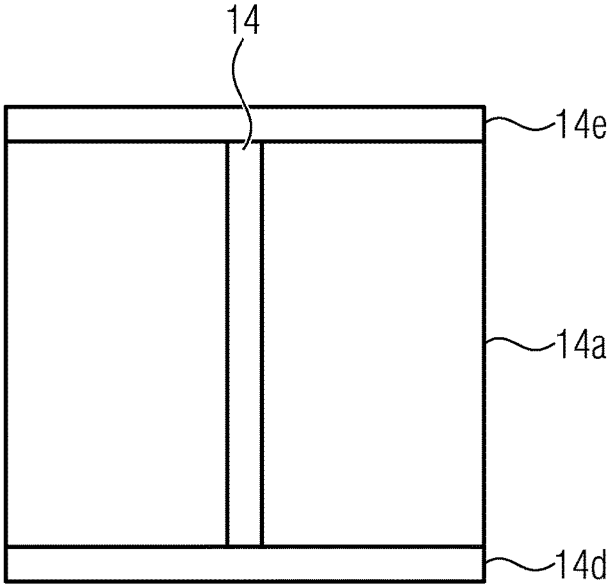
FIG. 1*b* shows a front view of a loudspeaker according to the first aspect of the invention.

FIG. 1*b* shows a front view of the loudspeaker, where the gap 16 is illustrated in the front view, wherein the entire housing, or the sound chamber, is enclosed by a lid 14*e* and a bottom 14*d*. Reference numeral 14*a* indicates the frontal wall in which the gap 16 is arranged. FIG. 1 shows an embodiment of a loudspeaker that is similar to FIG. 1*a*, however, in which a partition wall 18 having a partition wall end near the gap 16 and connected at the other side, i.e. at the side facing away from the gap, to the housing 14*b* of the first sound generator and the housing 14*c* of the second sound generator is arranged in the sound chamber so that communication from the first sound generator to the second sound generator takes place only around the area of the partition wall end, i.e. in the area in which the gap 16 is arranged as well.

In embodiments of the present invention, the partition wall 18 is provided if the signal generation for the push-pull signal for the respective sound generator is carried out such that the frequency content of the two push-pull signals is essentially equal. In such an implementation, interleaved band-passes are not used, with such an exemplary push-pull signal generation being illustrated in FIG. 4*c*. In the embodiment in FIG. 1*a*, on the other hand, a partition wall is not provided. This embodiment of the loudspeaker is combined with the push-pull signal generation in which the two push-pull signals for the two sound generators are generated by using interleaved band-passes so that the frequency content of the one push-pull signal is essentially interleaved with the frequency content of the other push-pull signal. However, it is to be noted that interleaved is to be understood as approximately interleaved, since band-pass filters comprise overlaps between neighboring channels because band-pass filters with a very steep edge cannot be implemented, or only with a very great effort. A band-pass filter implementation as schematically illustrated in FIG. 3*b* is also regarded as an interleaved band-pass filter implementation, even though there are overlap areas between the different band-pass filters, however, which are attenuated with respect to the frequency content at the center frequency of the respective band-pass filter by at least 6 dB and by at least 10 dB, for example.

While the push-pull signal generation without interleaved band-pass filters uses a high-pass filter with a cut-off frequency of 150-250 Hz and 190 to 210 Hz, it is advantageous to not use high-pass filtering when using the interleaved filters, but to also use the low frequency range for generating the two different push-pull signals.

Figure 1C:
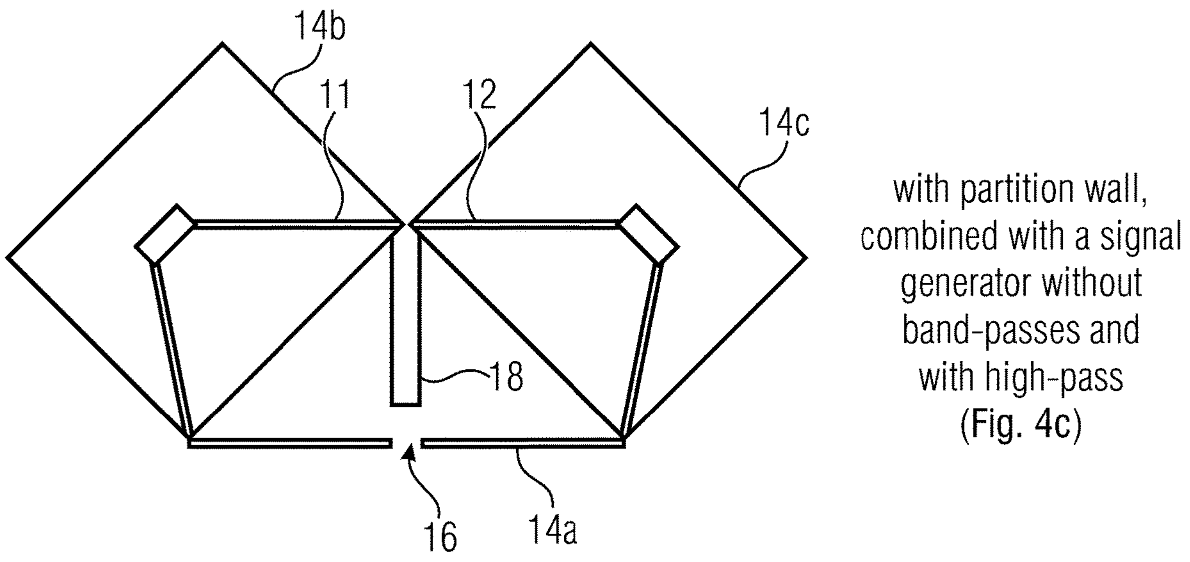
FIG. 1*c* shows a sectional view of the loudspeaker of FIG. 1*a* with an additional partition wall.
Figure 1D:
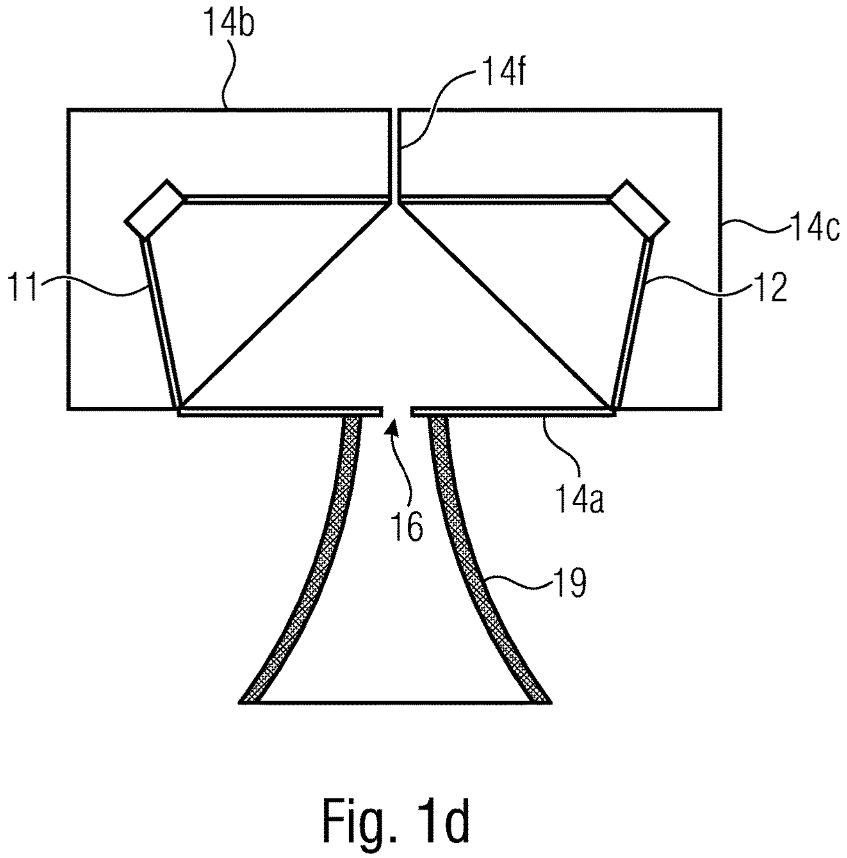
FIG. 1*d* shows a sectional view of a loudspeaker according to the first aspect of the present invention, with a sound impedance adjustment element, such as a horn.

FIG. 1*d* shows an alternative implementation of the loudspeaker of FIG. 1*a*, wherein the two sound generators are accommodated individually with the housings 14*b*, 14*c*, however, the housing has a more strongly pronounced rectangular shape, e.g., as is needed for certain implementations. However, a housing separation 14*f* is provided so as to separate the first sound generator 11 and the second sound generator 12 with respect to their rear volume. In addition, the housing is configured such that, in case of the sound chamber, the rear volume is also separated "at the front" from the sound chamber.

Furthermore, in the embodiment shown in FIG. 1*d*, in addition to the gap 16, an adjustment element 19, e.g. a horn, is provided so as to adjust the sound impedance at the gap with respect to the sound impedance in the surrounding area of the loudspeaker along the horn, such that a better sound exits and there is less reflection loss.

Figure 1E:
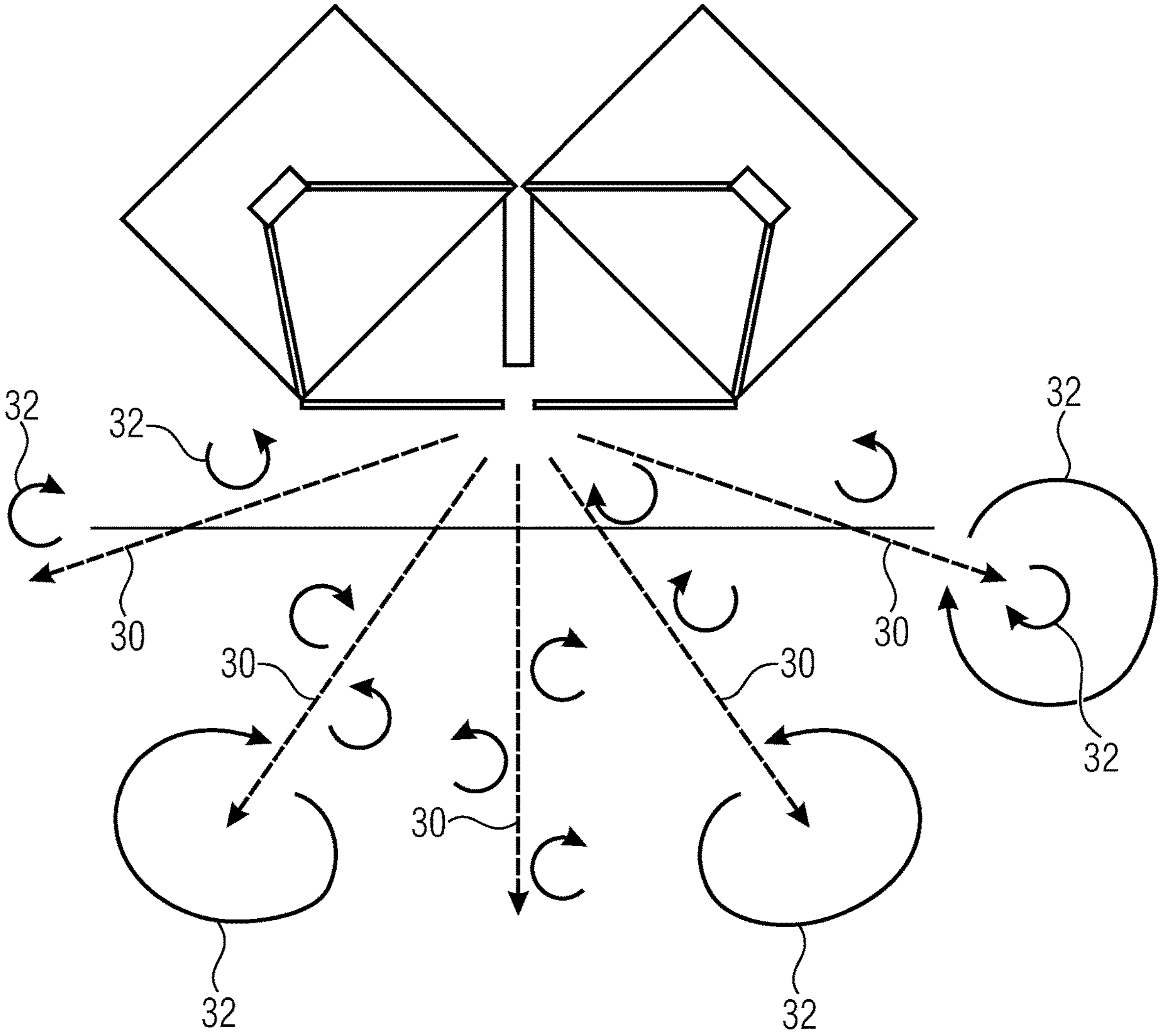
FIG. 1*e* shows a schematic illustration of the sound field with translational and rotatory sound particle velocity vectors in the surrounding area of the loudspeaker according to the first aspect of the present invention.

FIG. 1*e* shows a schematic illustration of the sound generator of FIG. 1*a* with a schematic illustration of the sound field in the surrounding area of the loudspeaker outside of the gap 16. Sound particle velocity vectors 30 representing the translational sound as it expands away from the gap in the surrounding area of the loudspeaker are exemplarily drawn in. In addition, schematically illustrated rotating sound particle velocity vectors 32 located in certain directions around, or between, the translational sound particle velocity vectors and representing a rotating sound field are also shown.

In embodiments of the present invention, the gap 16 in the frontal area 14 is configured such that the frontal area is separated, in a top view, into a left part arranged left of the gap in FIG. 1*b*, and a right part. The division is done in the center so that the gap extends in the frontal area, in the frontal dimension of the sound chamber, centrally from top to bottom, however, the deviation from the center may deviate in a tolerance range of +/−20° from the right dimension of the right part perpendicular to the gap. This means that the gap can be shifted towards the right or the left by 20% of the dimension of the right and left parts if the gap were to be arranged in the center.

In addition, as is shown in FIG. 1*b*, the gap is configured completely from top to bottom. However, the gap is not configured in the lid and in the bottom. In contrast, these two elements are configured continuously without an opening. In embodiments, the gap has a width of between 0.5 cm and 4 cm. The dimension of the gap is in a range of between 1 cm and 3 cm, and particularly between 1.5 cm and 2 cm.

The partition wall 18 shown in FIG. 1*c* is configured to divide the sound chamber into a first region for the first sound generator, and into a second region for the second sound generator, wherein an end of the partition wall is located close to the gap, but separated from the gap, so that the first region for the first sound generator and the second region for the second sound generator is in gas communication with the surrounding area of the loudspeaker through the gap. In addition, the first region and the second region are also in gas communication because the partition wall 18 does not extend completely up to the gap. At the other end, the partition wall is either connected to the first or the second sound generator, as is shown in FIG. 1*c*, for example. Alternatively, however, the partition wall may be arranged between the first and the second sound generator so that the first and the second sound generator do not contact each other, however, they are connected to the partition wall such that the gas communication is discontinued in the "rear" region of the partition wall. In embodiments, the height of the first housing 14*b* and the height of the second housing 14*c* is between 10 cm and 30 cm, and particularly between 15 cm and 25 cm. In addition, the width of the first housing and the width of the second housing is between 5 cm and 15 cm and particularly between 9 cm and 11 cm. The depth is in a range of between 5 cm and 15 cm, and particularly between 9 cm and 11 cm. An alternative implementation of the housing, as is shown in FIG. 1*d*, is similar to the previous embodiment. The width relates to one half of the housing so that the entire housing of the sound generator has a width of between 10 cm and 30 cm. The depth is similar to the dimensions as presented above.

Subsequently, on the basis of FIG. 2*a* to FIG. 4*c*, the second and the third aspects of the present invention are explained, i.e. the second aspect with respect to a signal processor separated from the loudspeaker, and the third aspect with respect to an integrated variation in which the loudspeaker is configured to be integrated with the signal processor. In particular, in the embodiment shown in FIG. 2*a*, the loudspeaker includes the signal processor or signal generator 105 configured to drive the first signal generator 11 and the second signal generator 12 with a first signal generator signal 51 and a second signal generator signal 52, respectively. In the embodiment shown in FIG. 2*a*, one amplifier 324 and 344 each is arranged in front of the sound generators 11, 12, respectively. According to the embodiment, these amplifiers may be integrated into the loudspeaker or may be integrated into the signal processor. However, if the signal processor is arranged remotely from the loudspeaker and communicates, e.g., in a wireless manner with the loudspeaker, it is advantageous to arrange the amplifiers 324, 344 in the loudspeaker and to transmit the signals 51, 52, e.g., in a wireless manner via a mobile telephone, as will be illustrated on the basis of FIG. 5, from the signal processor 105 to the loudspeaker, as is exemplarily illustrated in FIG. 1*a*.

In an embodiment, the signal processor includes a combiner 50 configured to overlap a common-mode signal supplied via an input 71 with a first push-pull signal. In the embodiment shown in FIG. 2*a*, this is done through the adder 322. In addition, the combiner is configured to overlap the common-mode signal supplied via the input 71 with a second push-pull signal, which is implemented by the adder 342 in the embodiment shown in FIG. 2*a*. In addition, the sound generator is configured such that the first push-pull signal supplied to the adder 322 and the second push-pull signal supplied to the adder 342 differ from one another. To generate these two push-pull signals, the signal generator includes a push-pull signal generator 60. The push-pull signal generator 60 is configured to obtain a base push-pull signal via an input 72, and to generate the first push-pull signal from the base push-pull signal by using a first push-pull signal processing, exemplarily shown at 326*e* in FIG. 2*a*, and to generate the second push-pull signal by using a second push-pull signal processing, exemplarily shown at 326*f* in FIG. 2*a*.

Figures 2A, 2B:
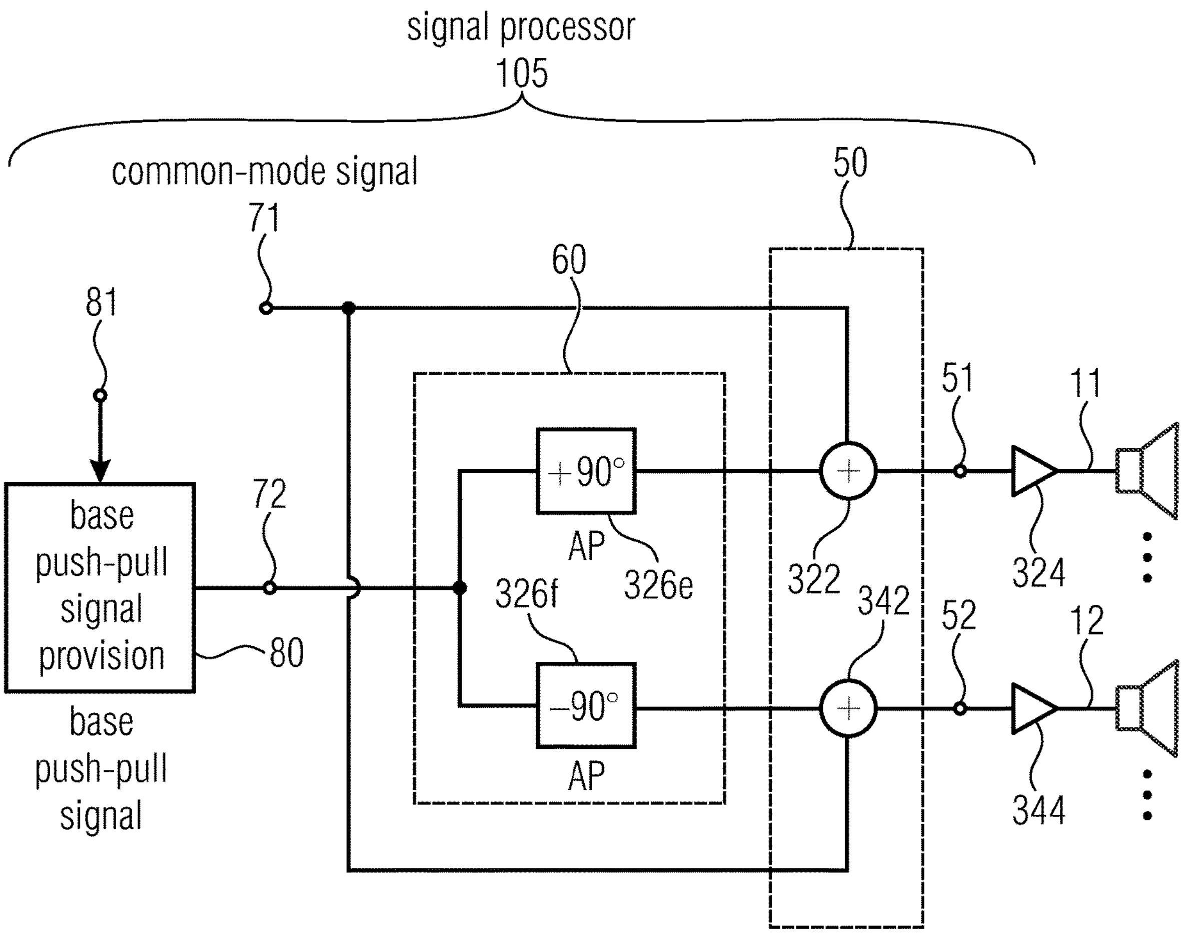
FIG. 2*a* shows a block circuit diagram of a signal processor according to a second aspect of the present invention, with schematically illustrated sound generators of the loudspeaker.
FIG. 2*b* shows a table overview for illustrating different possibilities for providing the base push-pull signal.

The first push-pull signal processing includes all-pass filtering, as is illustrated by "AP" in FIG. 2*a* and in the other figures. In addition, the second push-pull signal processing includes all-pass filtering, or an all-pass filter, as is also illustrated with "AP" in FIG. 2*a* and the other figures. The two all-pass filters 326*e*, 326*f* are configured to achieve a phase shift during the first push-pull signal processing, and to achieve a second phase shift that differs from the first phase shift during the second push-pull signal processing. In embodiments, in the context of the first push-pull signal processing, the phase shift is only +90°, and in the context of the second push-pull signal processing, the phase shift is −90°. This achieves a phase difference of 180° between the two push-pull signals. Alternatively, however, the two push-pull signal processings are configured to achieve a phase shift of between 135° and 225° between the two push-pull signals, wherein, in alternative embodiments, due to the all-pass filters 326*e*, 326*f*, the phase shifts are implemented such that one element generates a positive phase shift, e.g. the element 326*e*, and the other element generates a negative phase shift, e.g. the element 326*f*. Even in such an implementation, which does not necessarily have to have the optimum phase shift of 180° between the two push-pull signals, a certain portion of a rotating sound field is already generated in the sound field schematically shown in FIG. 1*e*. With a phase shift of between 170° and 190° between the two push-pull signals, the efficiency of the generation of the rotating sound field portion is in the best range.

In embodiments, the signal processor is further configured to provide the base push-pull signal for the input 72 of the push-pull signal generator 60. This is achieved by a base push-pull provider 80 that obtains an input signal via an input 81. Different variations for implementing the base push-pull signal provider 80 are illustrated in FIG. 2*b*. In an embodiment, the base push-pull signal is obtained separately, from a separate recording of the rotating sound field. Thus, this push-pull signal is not derived from a common-mode signal or from several common-mode signals, but, so to speak, is recorded "natively" in a sound environment, or is synthesized artificially in a sound synthesis environment. In such a case, the base push-pull provider 80 is configured to receive the base push-pull signal from a corresponding source, e.g., to decode the same and to forward it to the input 72, where, according to the implementation, delays or attenuations/amplifications may be carried out.

In an alternative implementation, in which the rotating sound field has not been recorded separately, the base push-pull signal may be obtained from the side signal of a center-side signal processing. Thus, the base push-pull signal provider is configured to obtain the common-mode signal 71 via the input 81, and any other channel signal, as will be illustrated on the basis of FIG. 4*b*, so as to determine, from a difference of these two signals, the side signal that may then be used directly or may be delayed or attenuated or amplified, according to the implementation.

In yet another alternative implementation, illustrated in FIG. 2*b* with number 3, the base push-pull signal is derived from the common-mode signal 71 by the base push-pull signal provider 80. This is needed if there is neither a multi-channel signal nor a native recording of the rotating sound field. As is exemplarily shown in FIG. 4*c*, deriving the base push-pull signal is done via high-pass filtering and, possibly, amplification or attenuation of the common-mode signal prior to high-pass filtering or after high-pass filtering.

There are further possibilities for generating a base push-pull signal, wherein a rotating sound field component is generated, since the first push-pull signal and the second push-pull signal are overlapped with the common-mode signal so that the two sound generators 11,12 in the loudspeaker perform a push-pull signal excitation that can be perceived outside of the gap 16 as a rotating sound field. According to a special generation of the push-pull signal, the rotating sound field will correspond more to the original physical rotating sound field. Thus, it has been shown that a derivation of the push-pull signal from the common-mode signal at a corresponding overlap through the signal combiner 50 already leads to a significantly improved hearing impression compared to an implementation in which the two sound generators are only driven with a common-mode signal and operate in a common mode-manner.

Figure 3A:
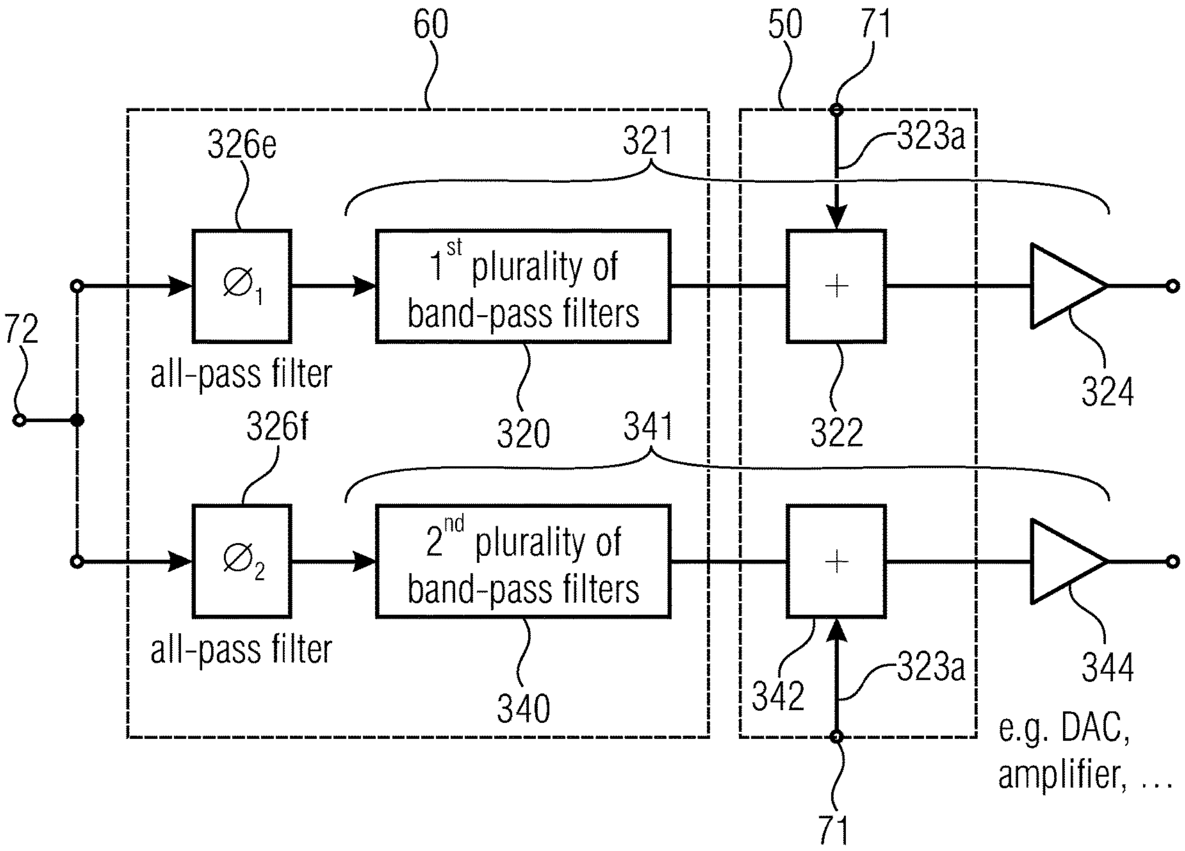
FIG. 3*a* shows an embodiment for illustrating the first and second push-pull signal processing of FIG. 2*a;*
Figure 3B:
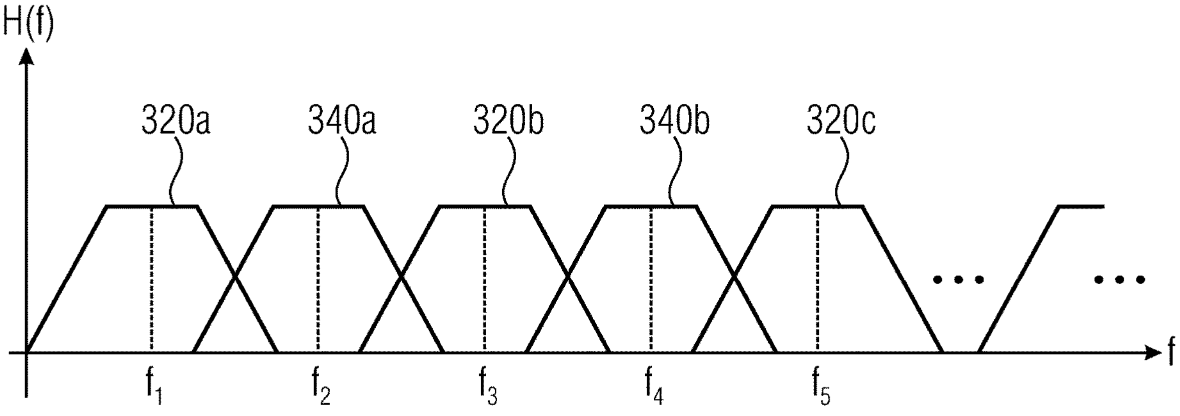
FIG. 3*b* shows a schematic illustration of the two different pluralities of band-pass filters.

FIG. 3*a* shows an embodiment of the push-pull signal generator. Apart from all of the all-pass filters 326*e*, 326*f*, which were already described with respect to FIG. 2*a* and which generate different phase shifts that have different signs, a first plurality of band-pass filters 320 is provided in the push-pull signal generator for the upper signal path 321, and a second plurality of band-pass filters 340 is provided for the lower signal path, i.e. the signal path 341.

The two band-pass filter implementations 320, 340 differ from each other, as is schematically illustrated in FIG. 3*b*. The band-pass filter with the center frequency f1, illustrated with respect to its transfer function H(f) in FIG. 3*b* with 320*a*, the band-pass filter 320*b* with the center frequency f3, illustrated with 320*b*, and the band-pass filter 320*c* with the center frequency f5 belong to the first plurality of band-pass filters 320 and are therefore arranged in the first signal pass 321, while the band-pass filter 340*a*, 340*b* with the center frequencies f2 and f4 are arranged in the lower signal path 341, i.e. they belong to the second plurality of band-pass filters. Thus, the band-pass filter implementation 320, 340 are configured to be interleaved with each other, or they are configured to be interdigital, so that the two signal transducers in one sound generator element, e.g. the sound generator element 100 of FIG. 1, emit signals with the same overall bandwidth, but differently in such a way that every second band is attenuated in each signal. This makes it possible to omit the partition ridge since the mechanical partition is replaced by an "electric" partition. The bandwidths of the individual band-pass filters in FIG. 3*b* are only shown schematically. The bandwidths increase from the bottom to the top, in the shape of an approximated Bark scale. In addition, it is advantageous to divide the entire frequency range into at least 20 bands so that the first plurality of band-pass filters includes 10 bands and the second plurality of band-pass filters also includes 10 bands, which then reproduce the entire audio signal through overlap due to the emission of the sound generators.

Figure 4A:
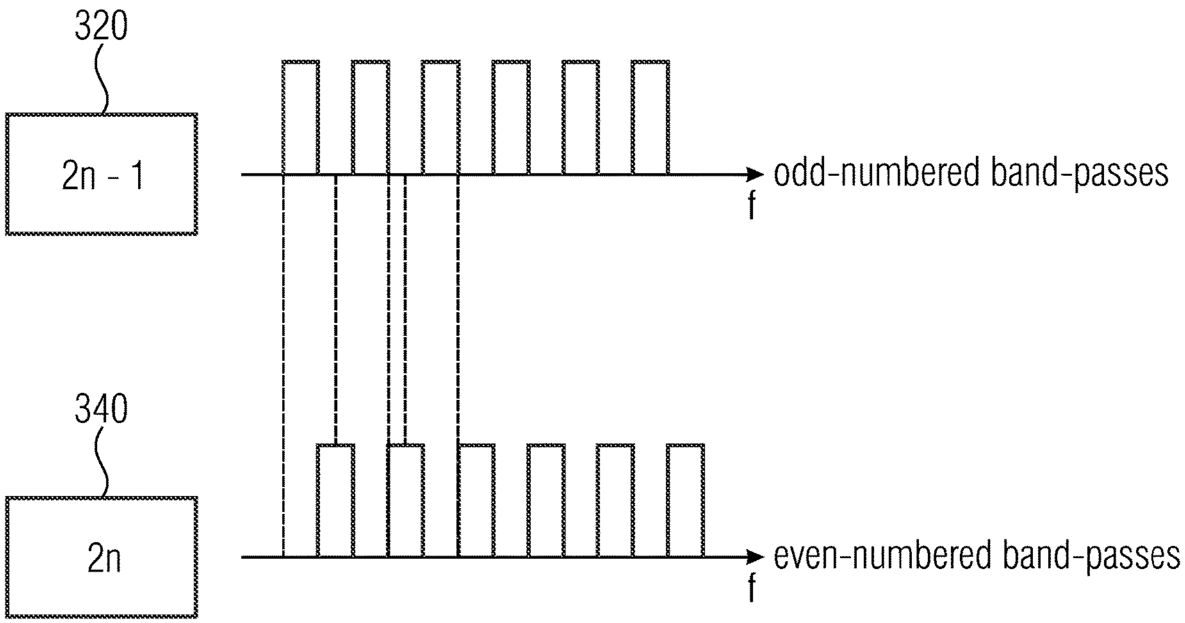
FIG. 4*a* shows a further schematic illustration of interleaved or interlocked or interlaced band-passes, divided into odd and even-numbered band-passes.

FIG. 4*a* shows a schematic illustration of using 2n even-numbered band-passes in the generation of the upper control signal, while using 2n−1 (odd-numbered band-passes) for the generation of the lower control signal.

Other subdivisions, or implementations, of the band-pass filters in a digital way, e.g. by means of a filterbank, a critically sampled filterbank, a QMF filterbank, or any type of Fourier transformation, or a MDCT implementation with subsequent combination or different processing of the bands can also be used. Similarly, the different bands may also have a constant bandwidth from the lower end to the upper end of the frequency range, e.g. from 50 to 10,000 Hz or above. In addition, the number of the bands may also be significantly larger than 20, e.g. 40 or 60 bands, so that each plurality of band-pass filters reproduces half of the entire number of bands, e.g. 30 bands in the case of 60 bands overall.

FIG. 3*a* illustrates an implementation of the signal combiner 50, wherein the output signal of the first plurality of band-pass filters and the common-mode signal 323*a* available at the common-mode signal input 71 are added via the adder 322. Accordingly, the second adder 342 in the signal combiner 50 adds the output signal of the second plurality of band-pass filters 340 and the common-mode signal 323*a* available at an input 71 of FIG. 2*a*, for example. In addition, the first all-pass filter 326*e* and the second all-pass filter 326*f* obtain the base push-pull signal. The base push-pull signal 72 is supplied directly to both all-pass filters 326*e*, 326*f* in the embodiment shown in FIG. 3*a*. Alternatively, amplification/attenuation may be provided either for both branches 321 and 341, or only for one branch. This could be useful, e.g., if the two signal generators in the loudspeaker as shown in FIG. 1*a* are not configured exactly symmetrically, or are not arranged exactly symmetrically.

In addition, FIG. 3*a* illustrates that the amplifiers 324, 344 may be configured not only as amplifiers, but also as digital-analog transducers, or as an input stage of a loudspeaker. Then, the radio distance between a signal processor, or signal generator, 105 and the loudspeakers would be located between the elements 322 and 324, or 342 and 344. In such an implementation, each loudspeaker is configured to receive two input signals, i.e. an input signal for each sound generator 11, 12, and to process, and particularly to amplify, these input signals accordingly, so as to obtain the control signals for the membranes of the sound generators 11, 12.

Figure 4B:
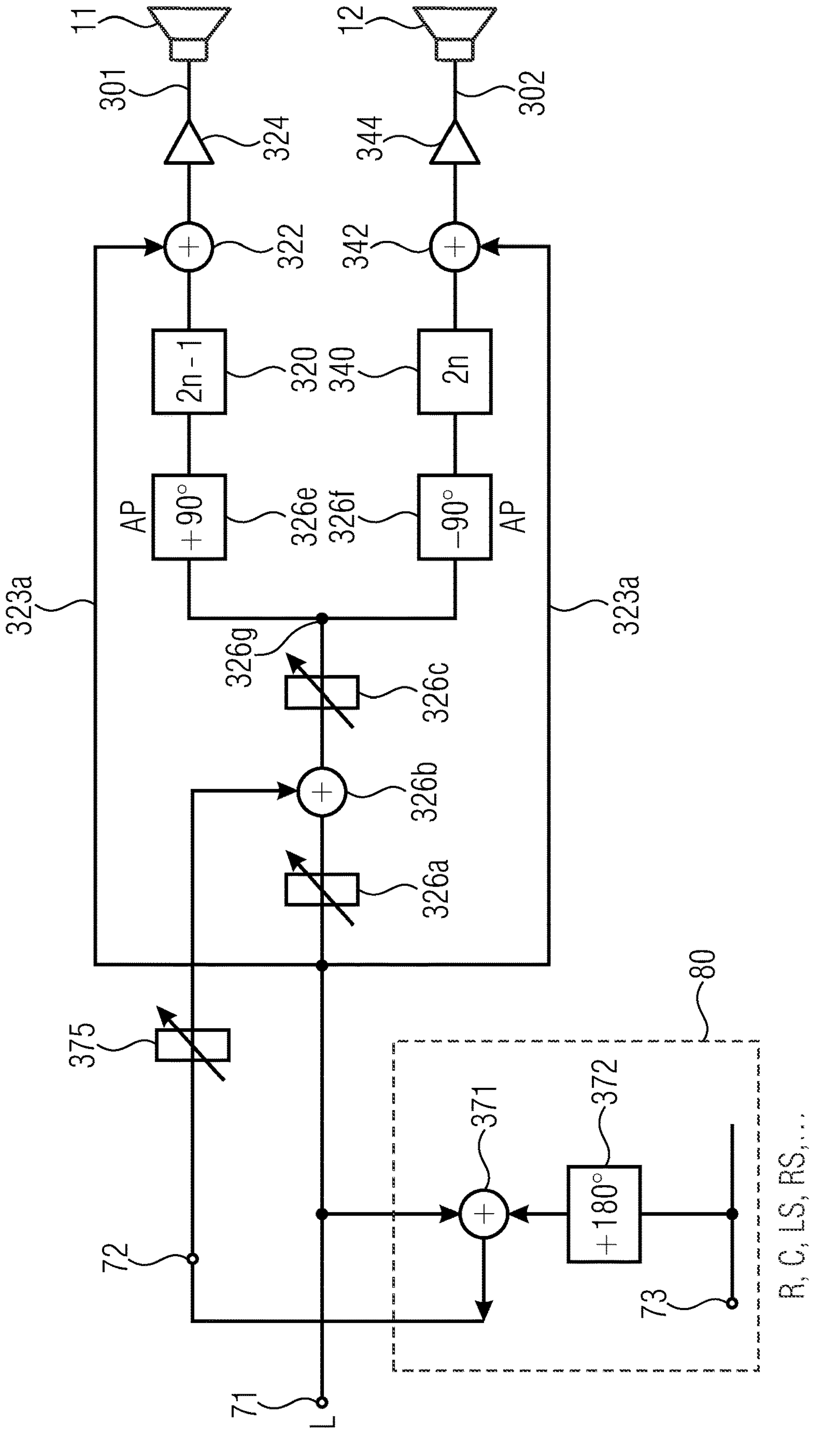
FIG. 4*b* shows an embodiment for generating the push-pull signal with a derivation of the base push-pull signal from a difference between two channels.

FIG. 4*b* shows an embodiment of a signal processor, in which the base push-pull signal provider 80 is configured as a side signal generator. For example, if the common-mode signal is a left signal at the input 71, the base push-pull signal 72 is y obtained by calculating a difference signal between the common-mode signal at the input 71 and another channel of a two or multi-channel representation, e.g., which may contain a right channel R, a center channel C, a left rear channel LS, or a right rear channel RS.

To obtain a difference formation, a phase reversal 372 is applied to the other channel at the input 73, achieving a phase shift of 180°. This is achieved if the signal is available as a difference signal between two poles. Then, the phase reversal 372 is simply achieved by plugging in the channel in a "reverse" manner into an adder 371, so to speak. The adder 371 is therefore configured such that the common-mode signal is plugged in at its one input "correctly", and the other channel signal is plugged in at its other input "incorrectly", so as to achieve the phase shift of 180° indicated by the phase shifter 372. In other implementations, other phase shifts may be used if an actual phase shifter is used instead of the "incorrect plug-in".

The difference signal at the output of the adder then represents the base push-pull signal 72, which may then be further processed. In the embodiment illustrated in FIG. 4*b*, the push-pull signal generator includes further elements, i.e. the potentiometers, or amplifiers, with an amplification of less than one 375, 326*a*, and the adder 326*b* and the potentiometer 326*c*. In contrast to the embodiment of FIG. 2*a* or FIG. 3*a* where the push-pull signal has been fed directly into the branch point 326*b* from the output 72 and from there into the two all-pass filters, or interleaved band-pass filters, the base push-pull signal in FIG. 4*b* is modified prior to branching, i.e. by an amplifier, or a potentiometer 375. Furthermore, the base push-pull signal is mixed with the common-mode signal at the input 71 via the adder 326*b*, and the result of the mixing is amplified by the amplifier, or the potentiometer 326*c*. However, it is to be noted that, if the amplifier 375 has an amplification factor of 1, if the amplifier 326*a* has an amplification factor of 0, i.e. attenuates fully, and if the amplifier 326*c* has an amplification factor of 1, the implementation of FIG. 4*b* is identical to the implementation of FIG. 2*a*, apart from the interleaved band-pass filters 320, 340, wherein, in the embodiment shown in FIG. 4*a* and particularly in FIG. 4*b*, odd-numbered band-passes are arranged in the upper branch, and even-numbered band-passes are arranged in the lower branch. However, the arrangement of even-numbered and odd-numbered band-passes may be done reversely so that the signal processed with the all-pass filter 326*e* is further processed with even-numbered band-pass filters. In the embodiments shown in FIG. 4*b*, it is further to be noted that the order of the all-pass filter and the filterbank may also be reversed. In alternative embodiments, the all-pass filters may also be omitted, since, in such a case, the filterbanks already lead to the push-pull signals being different in the upper branch and in the lower branch. Thus, an implementation with interleaved band-pass filters but without all-pass filters, where the branch point is the direct input into the filterbanks 320, 340, and the output of the filterbanks is directly connected to the corresponding input of the adders 322, 342, also leads to a sound signal at the output of the gap comprising translational or rotatory components.

In addition, the use of the all-pass filters has the advantage that the partition wall in the sound chamber can be omitted, as is illustrated in FIG. 1*a*. However, if interleaved filterbanks are not provided, e.g. as in FIG. 2*a* or in FIG. 4*c*, it is advantageous to provide the partition wall 18 in the sound chamber, as is illustrated in FIG. 1*c*.

Figure 4C:
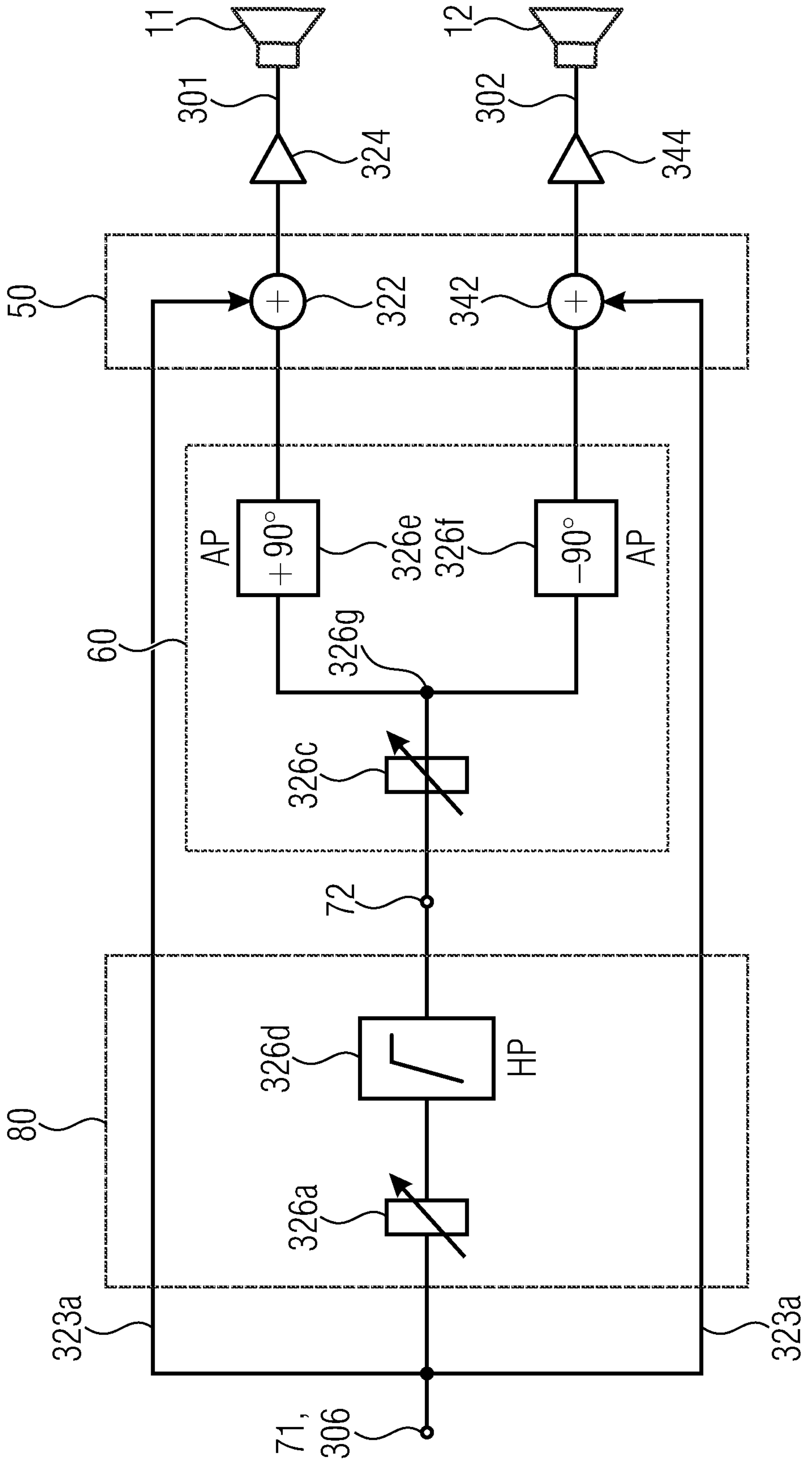
FIG. 4*c* shows an alternative illustration for generating the base push-pull signal from the common-mode signals.

FIG. 4*c* shows a special implementation of the base push-pull signal provider 80 of FIG. 2*a*, in the variation number of no. 3 of FIG. 2*b*. Here, the common-mode signal is amplified, or attenuated, at the input 306, which corresponds to the input 71, by an adjustable amplifier, or by a potentiometer 326*a*, and is then high-pass filtered via a high-pass filter (HP) as illustrated at 326*d*. The base push-pull signal 72 is then located at the output of the high-pass filter 326*d*, which is then, analogously to the implementation of FIG. 4*b*, amplified/attenuated with an adjustable amplifier/potentiometer 326*c* so as to be supplied to the branch point 326*g* via which, according to the implementation, the amplified or unchanged/unmodified base push-pull signal 72 is provided to the two all-pass filters 326*a*, 326*f*. The first push-pull signal and/or the second push-pull signal are then located at the output of the all-pass filters, which are then combined with the common-mode signal via the adders 322, 342, exemplarily implementing the signal combiner 50, as is illustrated by the lines 323*a*. According to the implementation, the control signals for the two sound generators 11, 12 may then be amplified by the amplifier 324, 344 and may be supplied to the sound generators 11, 12.

Figure 5:
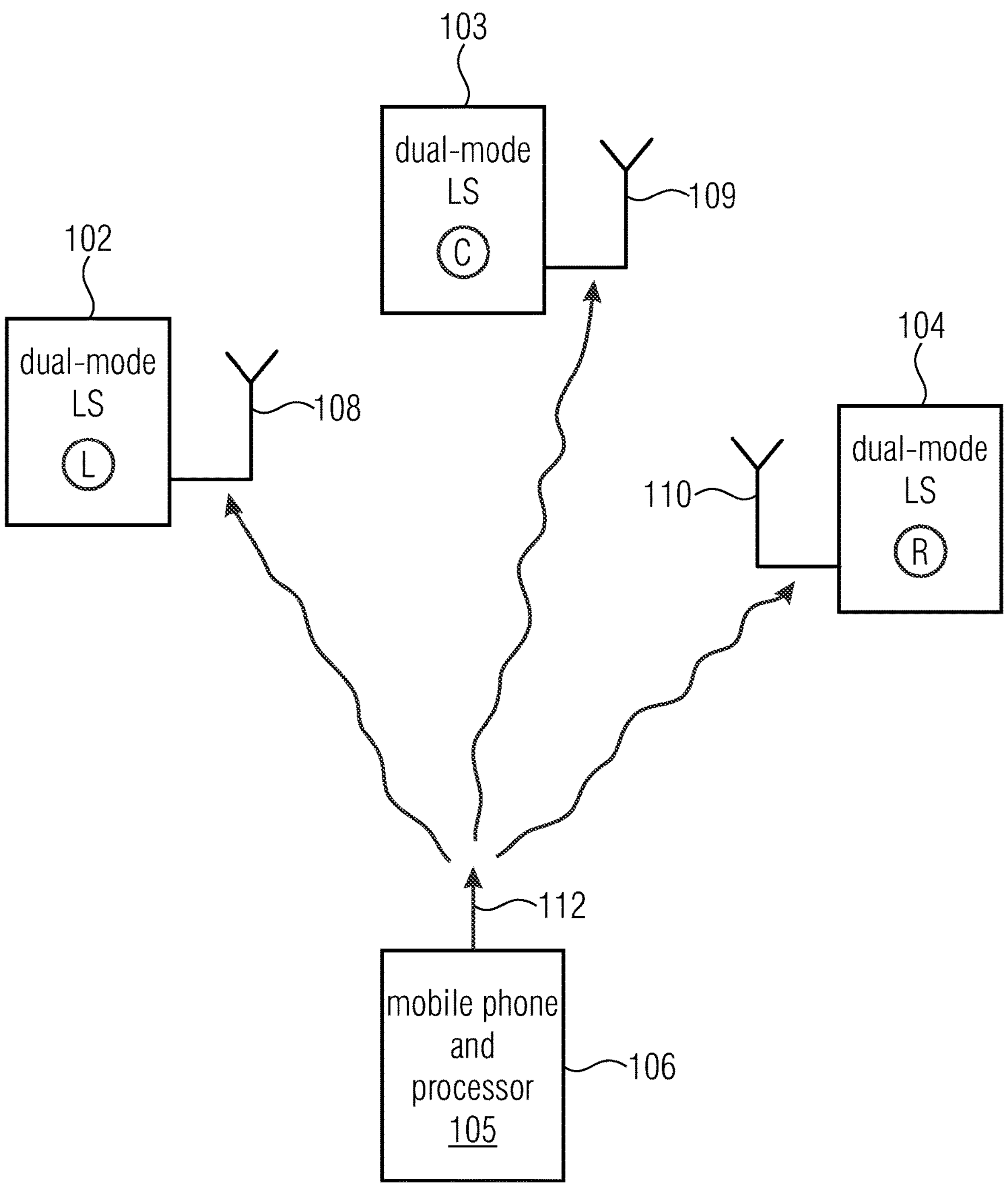
FIG. 5 shows a schematic illustration of a scenario with several dual-mode twin transducer loudspeakers and a mobile device, such as a mobile telephone, for driving the same.

FIG. 5 shows an implementation of the present invention in connection with a mobile device, such as a mobile telephone. A mobile device 106 includes an output interface symbolized by a transmission antenna 112. In addition, each loudspeaker 102, 103, 104, which may be implemented as in FIG. 1*a* to FIG. 1*e*, includes an input interface symbolized by input antennas 108, 109, 110. The mobile telephone 106 includes the signal processor, or signal generator, 105 illustrated in FIG. 2*a*, 3*a*, 4*b*, or 4*c* as the part that is located between the input 71, 73 and the output amplifiers 324, 344. The corresponding output amplifiers 324, 344 are arranged in each of the individual loudspeakers 102, 103, 104, and the signals to be amplified are supplied to the output of the respected input interfaces of the corresponding loudspeakers 102, 103, 104. In the scenario shown in FIG. 5, the audio signal is a three-channel signal with a left channel L, a center channel C, and a right channel R. The audio signal comes from an audio library in the mobile telephone 106 or originates from a remote audio server, such as a streaming service, etc. The interface symbolized by the transmission antenna 112 is a near-field interface, such as a Bluetooth interface.

According to the implementation, the mobile telephone, or the signal processor or signal generator 105, may be configured, as has been illustrated on the basis of FIG. 4*b*, to calculate the base push-pull signal as a difference between a left channel and, e.g., a right channel. If, however, in deviation from FIG. 5, a multi-channel representation with, e.g., five channels exists, as is illustrated in FIG. 4*b*, the base push-pull signal provider 80 may also be configured to calculate the side signal as a difference between a left downmix channel and a right downmix channel. The left downmix channel is calculated by addition of left and left rear (LS) and possibly using an additional addition with a weighted center channel C, e.g. weighted with the factor 1.5. In addition, the right downmix channel is calculated by addition of the right channel R and the right rear channel (RS) and possibly with a weighted center channel C, e.g. weighted with a factor of 1.5. Then, the side signal is obtained by subtraction of the left and the right downmix channels.

Alternatively, the side signal may also be obtained by subtraction of LS and RS, without using the push-pull signal. To calculate the side signal, any number of channel pairs or a downmix channel and an original channel, etc. may be used, and, as illustrated in FIG. 4*b*, the same common-mode signal then added to the two push-pull signals by the signal combiner does not have to be used to calculate the base push-pull signal.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A loudspeaker, comprising:

a first sound generator with a first emission direction, and a second sound generator with a second emission direction, wherein the first sound generator and the second sound generator are arranged with respect to each other such that the first emission direction and the second emission direction intersect in a sound chamber and comprise an intersection angle that is larger than 60° and smaller than 120°; and a housing that accommodates the first sound generator and the second sound generator and the sound chamber, wherein the housing comprises a gap configured to enable gas communication between the sound chamber and the surrounding area of the loudspeaker.

2. The loudspeaker according to claim 1, wherein the first sound generator comprises a first front side and a first rear side, wherein the second sound generator comprises a second front side and a second rear side, wherein the first front side and the second front side are directed towards the sound chamber so that the sound chamber is defined by the first front side, the second front side, and the housing, wherein the gap is configured in a frontal area of the housing, separating the sound chamber from the surrounding area of the loudspeaker.

3. The loudspeaker according to claim 2, wherein the gap in the frontal area is configured such that the frontal area is divided into a top view left part and a top view right part, wherein the left part comprises a left dimension perpendicular to the gap that is equal to a right dimension of the right part perpendicular to the gap within a tolerance of +/−20% of the dimension.

4. The loudspeaker according to claim 2, wherein, in the top view, the gap in the frontal area is configured completely from the bottom to the top.

5. The loudspeaker according to claim 2, wherein the housing is configured to separate a first rear area of the first sound generator behind the first rear side from a second rear area of the second sound generator behind the second rear side, and to separate the first rear area and the second rear area from the surrounding area of the loudspeaker.

6. The loudspeaker according to claim 1, wherein the housing comprises a bottom portion to limit the sound chamber towards the bottom, and a lid portion to limit the sound chamber towards the top.

7. The loudspeaker according to claim 1, wherein the gap comprises a width of between 0.5 cm and 4 cm.

8. The loudspeaker according to claim 1, wherein a partition wall is configured in the sound chamber, dividing the sound chamber into a first area for the first sound generator and into a second area for the second sound generator, wherein an end of the partition wall is located near the gap and spaced apart from the gap so that the first area and the second area are in gas communication with the surrounding area of the loudspeaker through the gap.

9. The loudspeaker according to claim 8, wherein the end of the partition wall is spaced apart from the gap by between 0.5 cm and 4 cm.

10. The loudspeaker according to claim 8, wherein the partition wall is connected to the housing or the first sound generator or the second sound generator at another end opposite the end near the gap so as to separate, at the other end, the first area from the second area with respect to a gas communication.

11. The loudspeaker according to claim 1, wherein an adjustment element is arranged at the gap so as to adjust a sound impedance at the gap with respect to a sound impedance in the surrounding area of the loudspeaker.

12. The loudspeaker according to claim 1, further comprising a signal generator to drive the first sound generator with a first sound generator signal, and to drive the second sound generator with a second sound generator signal, wherein the signal generator comprises a combiner configured to overlap a common-mode signal with a first push-pull signal so as to acquire the first sound generator signal, and to overlap the common-mode signal with a second push-pull signal so as to acquire the second sound generator signal, wherein the second push-pull signal differs from the first push-pull signal.

13. The loudspeaker according to claim 12, wherein the signal generator comprises a push-pull signal generator, wherein the push-pull signal generator is configured to acquire a base push-pull signal, and to generate the first push-pull signal from the base push-pull signal by using first push-pull signal processing, and to generate the second push-pull signal by using second push-pull signal processing, wherein the first push-pull signal processing comprises a first all-pass filter, and wherein the second push-pull signal processing comprises a second all-pass filter, wherein the first all-pass filter differs from the second all-pass filter.

14. The loudspeaker according to claim 13, wherein the first push-pull signal processing comprises a first plurality of band-pass filters, and the second push-pull signal processing comprises a second plurality of band-pass filters, wherein the first plurality of band-pass filters and the second plurality of band-pass filters are configured to be interleaved with respect to each other so that a band-pass channel of the first plurality of band-pass filters comprises a passage range in terms of frequency that corresponds to a blocking range in terms of frequency in the second plurality of band-pass filters.

15. The loudspeaker according to claim 14, wherein the first plurality of band-pass filters comprises at least two band-pass filters with a first center frequency and a third center frequency, and wherein the second plurality of band-pass filters comprises at least two band-pass filters comprising a second center frequency and a fourth center frequency, wherein the first center frequency, the second center frequency, the third center frequency, and the fourth center frequency are arranged in an increasing order in terms of frequency, and wherein the first plurality of band-pass filters comprises a blocking range at the second center frequency and the fourth center frequency, and wherein the second plurality of band-pass filters comprises a blocking range at the first center frequency and the third center frequency.

16. The loudspeaker according to claim 13, wherein the signal generator comprises a base push-pull signal provider configured to derive the base push-pull signal from the common-mode signal, or derive the base push-pull signal from two channel signals of a multi-channel representation comprising at least two channels, or acquire, via an input portion, a separate audio signal that is acquired separately from the common-mode signal.

17. The loudspeaker according to claim 16, wherein the base push-pull signal provider is configured to subject the common-mode signal to high-pass filtering when deriving the base push-pull signal, or to amplify or to attenuate the common-mode signal so as to acquire the base push-pull signal.

18. The loudspeaker according to claim 16, wherein the base push-pull signal provider is configured to determine a difference signal from the two channel signals, and to derive the base push-pull signal from the difference signal.

19. The loudspeaker according to claim 12, wherein the first push-pull signal processing is configured to cause a first phase shift, and wherein the second push-pull signal processing is configured to cause a second phase shift, wherein the second phase shift differs from the first phase shift, or wherein one of the two phase shifts is a positive phase shift and the other one of the two phase shifts is a negative phase shift, or wherein the first push-pull signal processing and the second push-pull signal processing are configured to each cause a phase shift so that a phase difference between the first push-pull signal and the second push-pull signal is between 135° and 225°, or wherein the first phase shift is between 70° and 110°, and the second phase shift is between −70° and −110°.

20. The loudspeaker according to claim 1, wherein the first sound generator is a sound generator that is accommodated in a first housing, wherein the second sound generator is a sound generator accommodated in a second housing, wherein the housing comprises the first housing for the first accommodated sound generator and the housing for the second accommodated sound generator and a portion for accommodating the sound chamber that is connected laterally, above and below with respect to the sound chamber, to the housing for the first accommodated sound generator and to the housing for the second accommodated sound generator, and comprises a lid and a bottom and a frontal wall, and wherein the gap in the frontal wall is configured continuously from top to bottom, and wherein the lid and the bottom are configured continuously.

21. The loudspeaker according to claim 20, wherein a height of the first housing or the second housing is between 10 cm and 30 cm, wherein a width of the first housing or the second housing is between 5 cm and 15 cm, wherein a depth of the first housing or the second housing is between 5 cm and 15 cm, or wherein the gap comprises a width of between 1 cm and 3 cm.

22. A signal processor for generating a control signal for a loudspeaker with a first sound generator and with a second sound generator, wherein the control signal comprises a first sound generator signal for the first sound generator and a second sound generator signal for the second sound generator, comprising:

an input for receiving a channel signal for the loudspeaker;

a signal combiner configured to overlap a common-mode signal with a first push-pull signal so as to acquire the first sound generator signal, and to overlap the common-mode signal with a second push-pull signal so as to acquire the sound generator signal, wherein the second push-pull signal differs from the first push-pull signal; and wherein the signal processor is configured to derive the common-mode signal or the first and the second push-pull signal from the channel signal for the loudspeaker, and an output interface for outputting the first sound generator signal and the second sound generator signal.

23. The signal processor according to claim 22, comprising a push-pull signal generator, wherein the push-pull signal generator is configured to acquire a base push-pull signal, and to generate the first push-pull signal from the base push-pull signal by using first push-pull signal processing, and to generate the second push-pull signal by using second push-pull signal processing, wherein the first push-pull signal processing comprises a first all-pass filter, and wherein the second push-pull signal processing comprises a second all-pass filter, wherein the first all-pass filter differs from the second all-pass filter.

24. The signal processor according to claim 23, wherein the first push-pull signal processing comprises a first plurality of band-pass filters, and the second push-pull signal processing comprises a second plurality of band-pass filters, wherein the first plurality of band-pass filters and the second plurality of band-pass filters are configured to be interleaved with respect to each other so that a band-pass channel of the first plurality of band-pass filters comprises a passage range in terms of frequency that corresponds to a blocking range in terms of frequency in the second plurality of band-pass filters.

25. The signal processor according to claim 24, wherein the first plurality of band-pass filters comprises at least two band-pass filters with a first center frequency and a third center frequency, and wherein the second plurality of band-pass filters comprises at least two band-pass filters comprising a second center frequency and a fourth center frequency, wherein the first center frequency, the second center frequency, the third center frequency, and the fourth center frequency are arranged in an increasing order in terms of frequency, and wherein the first plurality of band-pass filters comprises a blocking range at the second center frequency and the fourth center frequency, and wherein the second plurality of band-pass filters comprises a blocking range at the first center frequency and the third center frequency.

26. The signal processor according to claim 22, wherein the first push-pull signal processing is configured to cause a first phase shift, and wherein the second push-pull signal processing is configured to cause a second phase shift, wherein the second phase shift differs from the first phase shift, or wherein one of the two phase shifts is a positive phase shift and the other one of the two phase shifts is a negative phase shift, or wherein the first push-pull signal processing and the second push-pull signal processing are configured to each cause a phase shift so that a phase difference between the first push-pull signal and the second push-pull signal is between 135° and 225°, or wherein the first phase shift is between 70° and 110°, and the second phase shift is between −70° and −110°.

27. The signal processor according to claim 22, comprising a base push-pull signal provider configured to derive the base push-pull signal from the common-mode signal, or derive the base push-pull signal from two channel signals of a multi-channel representation comprising at least two channels, or acquire, via an input portion, a separate audio signal that is acquired separately from the common-mode signal.

28. The signal processor according to claim 27, wherein the base push-pull signal provider is configured to subject the common-mode signal to high-pass filtering when deriving the base push-pull signal, or to amplify or to attenuate the common-mode signal so as to acquire the base push-pull signal.

29. The signal processor according to claim 27, wherein the base push-pull signal provider is configured to determine a difference signal from the two channel signals, and to derive the base push-pull signal from the difference signal.

30. The signal processor according to claim 22, arranged in a mobile telephone, wherein the input can be coupled to an audio library stored in the mobile telephone, stored in the mobile device, or wherein the input can be coupled to a remotely arranged audio library via an interface of the mobile device, and wherein the output interface is a Bluetooth interface or a Wi-Fi interface.

31. A method for manufacturing a loudspeaker with a first sound generator with a first emission direction, and a second sound generator with a second sound emission direction, comprising:

arranging the first sound generator and the second sound generator with respect to each other such that the first emission direction and the second emission direction intersect in a sound chamber and comprise an intersection angle that is larger than 60° and smaller than 120°; and accommodating the loudspeaker with a housing that accommodates the first sound generator and the second sound generator and the sound chamber, wherein the housing comprises a gap configured to enable a gas communication between the sound chamber and the surrounding area of the loudspeaker.

32. A method for operating a signal processor for generating a control signal for a loudspeaker with a first sound generator and with a second sound generator, wherein the control signal comprises a first sound generator signal for the first sound generator and a second sound generator signal for the second sound generator, comprising:

receiving a channel signal for the loudspeaker;

combining signals to overlap a common-mode signal with a first push-pull signal so as to acquire the first sound generator signal, and to overlap the common-mode signal with a second push-pull signal so as to acquire the sound generator signal, wherein the second push-pull signal differs from the first push-pull signal; and wherein the common-mode signal or the first and the second push-pull signal are derived from the channel signal for the loudspeaker, and outputting the first sound generator signal and the second sound generator signal.

33. A non-transitory digital storage medium having a computer program stored thereon to perform the method for operating a signal processor for generating a control signal for a loudspeaker with a first sound generator and with a second sound generator, wherein the control signal comprises a first sound generator signal for the first sound generator and a second sound generator signal for the second sound generator, the method comprising:

receiving a channel signal for the loudspeaker;

combining signals to overlap a common-mode signal with a first push-pull signal so as to acquire the first sound generator signal, and to overlap the common-mode signal with a second push-pull signal so as to acquire the sound generator signal, wherein the second push-pull signal differs from the first push-pull signal; and wherein the common-mode signal or the first and the second push-pull signal are derived from the channel signal for the loudspeaker, and outputting the first sound generator signal and the second sound generator signal, when said computer program is run by a computer.

* * * * *